United States Patent [19]

Ashbaugh et al.

[11] Patent Number: 4,793,745

[45] Date of Patent: Dec. 27, 1988

[54] DOUBLE DIAMETER BORING TOOL

[75] Inventors: Fred N. Ashbaugh, Belton; Kenneth R. Murry, Odessa, both of Mo.

[73] Assignee: The United States of America as represented by the United States Department of Energy, Washington, D.C.

[21] Appl. No.: 827,704

[22] Filed: Feb. 10, 1986

[51] Int. Cl.⁴ ............................................. B23B 51/00
[52] U.S. Cl. .................................... 408/1 R; 408/147; 408/224; 408/713
[58] Field of Search ............... 408/1 R, 54, 189, 190, 408/191, 194, 211, 212, 213, 223, 224, 227, 216, 218, 229, 150, 151, 225, 147, 181, 185, 193, 195, 197, 198, 225, 713; 409/177; 407/51, 55, 52, 54; 82/1.2, 1.4

[56] References Cited

U.S. PATENT DOCUMENTS

| 1,418,485 | 6/1922 | Smith | 408/223 |
| 3,241,404 | 3/1966 | Sirola | 408/185 |
| 4,034,452 | 7/1977 | Edming | 407/54 |
| 4,176,990 | 12/1979 | Gover, Sr. | 408/189 |
| 4,243,348 | 1/1981 | Paige | 407/54 X |
| 4,411,563 | 10/1983 | Moon | 408/230 |

FOREIGN PATENT DOCUMENTS

| 1171882 | 1/1959 | France | 408/150 |
| 2419129 | 11/1979 | France | 408/147 |
| 573266 | 10/1977 | U.S.S.R. | 408/225 |
| 1580024 | 11/1980 | United Kingdom | 408/169 |
| 2152410 | 8/1985 | United Kingdom | 408/181 |

Primary Examiner—Z. R. Bilinsky
Attorney, Agent, or Firm—Anne D. Daniel; James H. Chafin; Judson R. Hightower

[57] ABSTRACT

A boring tool and a method of operation are provided for boring two concentric holes of precision diameters and depths in a single operation. The boring tool includes an elongated tool body, a shank for attachment to a standard adjustable boring head which is used on a manual or numerical control milling machine and first and second diametrically opposed cutting edges formed for cutting in opposite directions. The diameter of the elongated tool body is substantially equal to the distance from the first cutting edge tip to the axis of rotation plus the distance from the second cutting edge tip to the axis of rotation. The axis of rotation of the tool is spaced from the tool centerline a distance substantially equal to one-half the distance from the second cutting edge tip to the axis of rotation minus one-half the distance from the first cutting edge tip to the axis of rotation. The method includes the step of inserting the boring tool into the boring head, adjusting the distance between the tool centerline and the tool axis of rotation as described above and boring the two concentric holes.

5 Claims, 1 Drawing Sheet

DOUBLE DIAMETER BORING TOOL

The U.S. Gobernment has rights in this invention pursuant to Contract No. DE-AC04-76DP00613 between the United States Department of Energy and Allied Corporation, Bendix Kansas City Division.

BACKGROUND OF THE INVENTION

The present invention relates generally to drilling, boring and milling tools and, more particularly, to a two-edge boring tool and method for boring two concentric holes of precision diameters and precision depths in a single operation.

In the past when boring two concentric holes of different depths and diameters, it has been customary to use two boring machines each having a tool of a different diameter or a single boring machine using first a tool of one diameter, then a tool of another. The disadvantages associated with separate tools, multiple set-ups and special boring machines can be easily appreciated. These include but are not limited to additional capital outlay for equipment, increased down time for tool replacement, problems with maintaining concentricity under strict tolerances and longer product production time adversely affecting overall productivity efficiency.

In order to overcome these problems, special combination cutting tools have been developed for cutting two or more concentric holes in a single operation. An example of such a tool is showing U.S. Pat. No. 4,411,563 to Moon. In its simplest form, the Moon cutting tool includes two sets of cutting edges of different diameters. Both sets of cutting edges are arranged for rotation around the tool centerline to cut two concentric holes of different diameters and depths.

While the Moon cutting tool effectively reduces work handling and eliminates separate machines and operations in boring two concentric holes, it is not without its disadvantages. Since the tool is made for rotation about its centerline, it does not permit any adjustment in hole size. As a result, the tool must be carefully and exactly machined at great production expense. The tools are very difficult to grind or sharpen as each cutting edge set diameter must be precisely to size if a hole of precise diameter is to be achieved. Therefore cutting tools of this type are typically replaced at great expense rather than resharpened. Further, due to machining limitations, it should be appreciated that tools of this type are not suitable when tolerance requirements for the product work piece are held extremely close (i.e under 0.001").

A need is therefore identified for an improved cutting tool capable of boring two concentric holes each of precision depth and precision diameter.

SUMMARY OF THE INVENTION

Accordingly, it is a primary object of the present invention to provide an improved boring or cutting tool overcoming the above-described limitations and disadvantages of the prior art.

A more specific object of the present invention is to provide a double diameter boring or cutting tool that is simpler and less expensive to fabricate or manufacture.

Another object of the present invention is to provide an adjustable cutting tool for precisely boring two concentric holes of different diameters and depths to more stringent tolerance requirements than possible in the past.

Still another object of the present invention is to provide a simple method of boring two concentric holes each of precision diameter and precision depth in a single operation while also allowing adjustment for improved dimensional accuracy.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved boring tool is provided for utilization in an off-center boring device. The boring tool includes an elongated tool body. The tool centerline and axis of rotation of the tool are spaced from each other. The distance between the tool centerline and axis of rotation is adjustable so as to advantageously allow precise size control of both concentric hole diameters.

A first cutting means terminates in a first cutting edge having a first tip spaced from the axis of rotation. Similarly, a second cutting means terminates in a second cutting edge having a second tip also spaced from the axis of rotation. The spacing of the first and second cutting edges tips from the axis of rotation is such that the first cutting edge bores a relatively small diameter hole while the second cutting edge bores a relatively large diameter hole.

Preferably, the first and second cutting edges are formed for cutting in opposite directions as the cutting tool is rotated. Further, the diameter of the elongated tool body is substantially equal to the distance from the first cutting edge tip to the axis of rotation plus the distance from the second cutting edge tip to the axis of rotation. Advantageously, since there are only two cutting edges and one diameter to hold to a close tolerance, the tool is relatively easy and inexpensive to fabricate.

When adjusting the tool for precise boring of two concentric holes, preferably the distance between the tool centerline and the axis of rotation is substantially equal to one half the distance from the second cutting edge tip to the axis of rotation minus one half the distance from the first cutting edge tip to the axis of rotation.

In a further aspect of the invention, in accordance with its objects and purposes, a method of boring two concentric holes of precision diameters and depths in a single operation includes the step of adjusting the distance between the tool centerline and tool axis of rotation so as to precisely control the diameters of the two concentric holes being cut. This advantageously allows the boring of two concentric holes in a single operation with an accuracy and precision unobtainable in the prior art.

Preferably, the adjusting includes the step of setting the off center boring head so that the distance between the tool centerline and axis of rotation is substantially equal to one half the distance from the second cutting edge tip to the axis of rotation minus one half the distance from the first cutting edge tip to the axis of rotation. An additional step for precisely adjusting the diameters of the holes to be bored includes slightly altering this offset distance.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
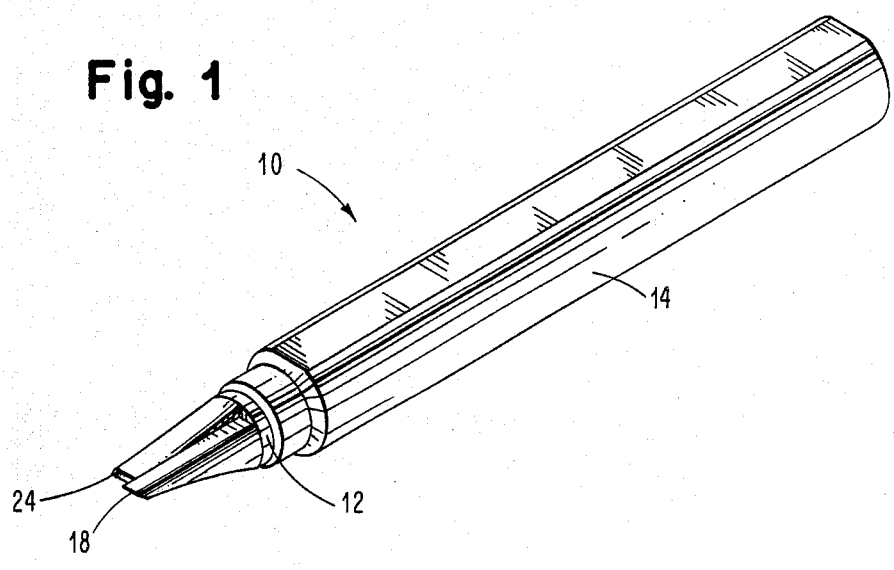
FIG. 1 is a perspective view of the boring tool of the present invention.

Reference is now made to FIG. 1 showing the boring tool 10 of the present invention for boring two concentric holes of precision diameters and depths in a single operation. The boring tool 10 includes a tool body 12 of diameter A having a shank 14 for attachment to a standard adjustable boring head H and illustrated on milling machine (note FIG. 2)

Figure 2:
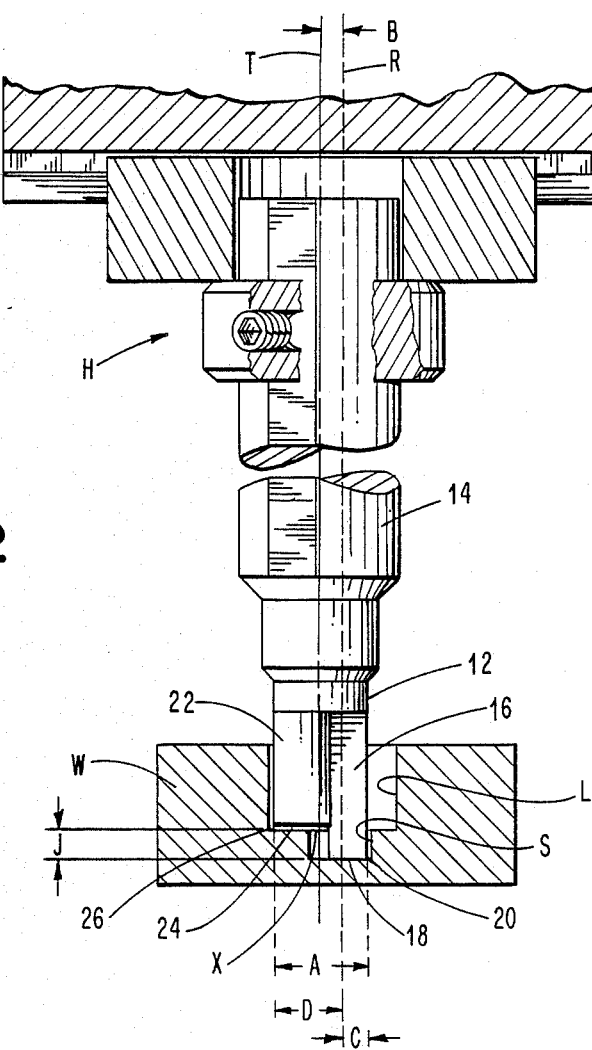
FIG. 2 is a schematic side elevational representation of the boring tool of the present invention being used in an off-center boring head to bore two concentric holes each having a precision diameter and depth.

As shown in FIG. 2, the boring tool 10 includes a first cutting means 16 terminating in a first cutting edge 18 having a first tip 20. A second cutting means or flute 22 terminates in a second cutting edge 24 having a second tip 26. The first and second cutting means 16, 22 are diametrically opposed and formed for cutting in opposite directions during rotation of the tool 10.

As is clearly shown in FIG. 2, the axis of rotation R of the tool 10 during boring is spaced a distance B from the tool's centerline T along the diametric line running parallel to the cutting edges 18, 24 of the first and second cutting means 16, 22. Thus, it should be appreciated that the tool body diameter A is equal to the distance C from the first cutting edge tip 20 to the axis of rotation R plus the distance D from the second cutting edge tip 26 to the axis of rotation R. Consequently, the first cutting means 16 bores a relatively small diameter hole S while the second flute 22 bores a relatively large diameter hole L in the workpiece W. The difference in depth between the two holes S and L produced in the workpiece W is provided by the distance J along the longitudinal axis of the tool 10 between the first and second cutting edges 18, 24.

The boring tool 10 of the present invention is easy to use to precisely and accurately bore two concentric holes in a single operation. The shank 14 of the tool is initially inserted into the adjustable boring head assembly H and then inserted into the milling machine spindle. The next step involves adjusting the distance between the tool's centerline T and the tool's axis of rotation R along the diametric line parallel to the cutting edges 18, 24 of the two cutting means 16, 22 of the tool 10. Preferably, the boring machine is set so that the distance B between the tool's centerline T and the axis of rotation R is substantially equal to one-half the distance D from the second cutting edge tip 26 to the axis of rotation minus one-half the distance C from the first cutting edge tip 20 to the axis of rotation. The distance B may, however, be altered slightly to precisely adjust the diameters of the holes S, L to be produced and bring them within tolerances unachievable with dual bore single operation tools and methods previously known in the art.

Additionally, it should be appreciated that the edge portion X of the cutting edge 24 is non-functional, i.e. the workpiece in this area is bored by the first cutting edge 18. As a result, grind marks, runout, radius, undercut or any other imperfections that might occur in this portion when machining the tool 10 do not affect the quality or function of the tool. Thus, only finished cutting edges 18, 24 long enough to generate each land to be machined are required.

In summary, numerous benefits result from employing the concepts of the present invention. The boring tool 10 of the present invention for producing two concentric bores in a single operation is relatively simple and inexpensive to fabricate. Only one diameter A and two cutting edges 18, 24 need to be machined to close tolerances. Together, the apparatus and method of the present invention reduces capital expenses in the boring operation, as well as on the initial equipment investment required. The apparatus and method reduce set-up time, production time and provide a more accurate, efficient and economical means and method of producing precision holes with a common centerline but of different depths.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of boring two concentric holes of different depths, utilizing an elongated boring tool having a tool axis of rotation, a longitudinally disposed tool centerline axis, and first and second transverse cutting edges at one end thereof extending across said boring tool, said second cutting edge being longitudinally rearwardly recessed with respect to said first cutting edge, comprising the steps of:

inserting said boring tool into an adjustable boring head;

adjusting a distance B between said tool centerline axis and said tool axis of rotation such that said tool axis of rotation intersects a first boring area of said first cutting edge; and boring said concentric holes having respectively larger and smaller diameters.

2. The method of claim 1 and including the selection of a boring tool having a diameter A equal to the sum of the radii of said concentric holes of said larger and smaller diameters, wherein the step of adjusting said distance B includes setting said distance B equal to one-half of a desired radius of said concentric hole of larger diameter less one-half of a desired radius of said concentric hole of smaller diameter.

3. A boring tool, having a tool axis of rotation, for utilization in an adjustable boring head or the like, comprising an elongated tool body having a diameter A and having a longitudinally disposed tool centerline axis spaced an adjustable distance B from said tool axis of rotation;

a first cutting means at one end of the tool body terminating in a first transversely disposed cutting edge extending radially across a portion of said tool body, said first cutting edge radially terminating at a first tip for boring a relatively small diameter hole; and a second cutting means at said one end of said tool body, terminating in a second transversely disposed cutting edge extending radially across the remaining portion of said tool body from said tool axis of rotation, said second cutting edge terminating at a second tip, and said second cutting edge being longitudinally rearwardly recessed with respect to said first cutting edge, for boring a relatively large diameter hole;

whereby, upon adjusting said boring head to offset said centerline axis of said boring tool with respect to said tool axis of rotation by said distance B such that said axis of rotation intersects a first boring area of said first cutting edge, two concentric holes of different depths can be bored.

4. The boring tool of claim 3, wherein said first and second cutting edges are perpendicular to said tool centerline axis.

5. The boring tool of claim 3, wherein said diameter A of said tool body is equal to the sum of the radii of the desired said relatively small diameter hole and said relatively large diameter hole, and said adjustable distance B is equal to one-half of the distance from said second cutting tip to said tool axis of rotation less one-half of the distance from said first cutting tip to said tool axis of rotation.

* * * * *

UNITED STATES PATENT AND TRADEMARK OFFICE
CERTIFICATE OF CORRECTION

PATENT NO. : 4,793,745
DATED : December 27, 1988
INVENTOR(S) : Fred A. Ashbaugh et al It is certified that error appears in the above-identified patent and that said Letters Patent is hereby corrected as shown below:

On the title page, after "Inventors:", "Fred N. Ashbaugh" should read -- Fred A. Ashbaugh --.

Signed and Sealed this

Tenth Day of October, 1989

Attest:

DONALD J. QUIGG

Attesting Officer

Commissioner of Patents and Trademarks